United States Patent

[11] 3,622,108

| [72] | Inventor | George A. Mathewson |
| | | 4312 South Salina St., Syracuse, N.Y. 13205 |
| [21] | Appl. No. | 13,808 |
| [22] | Filed | Feb. 27, 1970 |
| [45] | Patented | Nov. 23, 1971 |

[54] SAFETY DEVICE FOR DISABLED AIRPLANES
6 Claims, 8 Drawing Figs.

[52] U.S. Cl. .................................................... 244/139
[51] Int. Cl. ..................................................... B64d 17/80
[50] Field of Search .......................................... 244/139, 138

[56] References Cited
UNITED STATES PATENTS

| 3,508,727 | 4/1970 | Willems | 244/140 |
| 3,107,887 | 10/1963 | Dixon et al. | 244/139 |
| 1,583,745 | 5/1926 | Procopio | 244/139 X |
| 1,569,391 | 1/1926 | Pearl et al. | 244/139 |

Primary Examiner—Milton Buchler
Assistant Examiner—Carl A. Rutledge

ABSTRACT: The invention is concerned with an emergency system for safely landing disabled aircraft without serious damage to the aircraft or to the occupants thereof. The system preferably includes a parachute connected to the aircraft by a flexible cable and normally housed in a turret from which it may be quickly ejected and deployed in times of emergency to preliminarily reduce both the forward motion and the rate of descent of the aircraft. The system also includes an inflatable envelope or balloon which is flexibly connected to the aircraft and normally stored in a separate turret from which it can be ejected and quickly filled with air and/or a heated gaseous medium as derived from the exhaust of a jet engine or other appropriate source on the aircraft, following sufficient retardation of the rate of descent by the previously deployed parachute to avoid damage to the envelope or balloon. By suitably regulating the flow of the heated gaseous medium and the resulting mixture thereof with the air in the balloon, the rate of descent of the aircraft can be reduced to a safe landing speed which prevents or minimizes impact damage to the aircraft and to the occupants thereof upon impact with the ground under emergency conditions such as may be caused by power failure during flight.

PATENTED NOV 23 1971 3,622,108
SHEET 1 OF 4
FIG.1
FIG.2
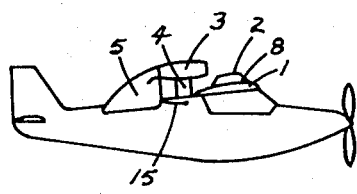
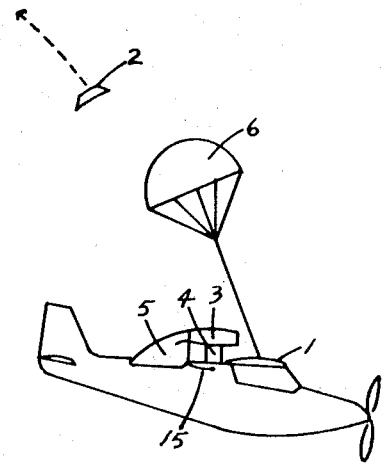
FIG.3
FIG.4
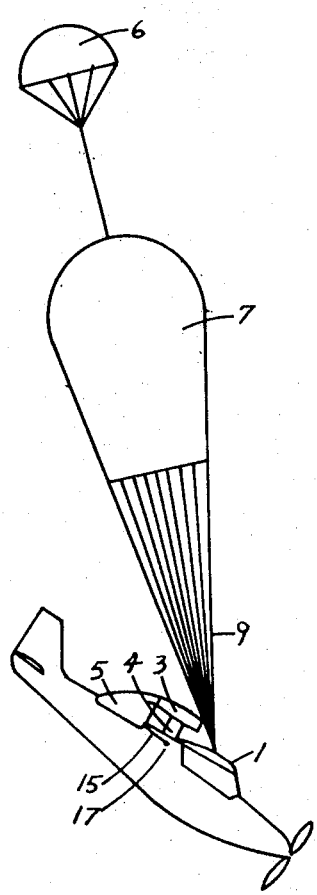
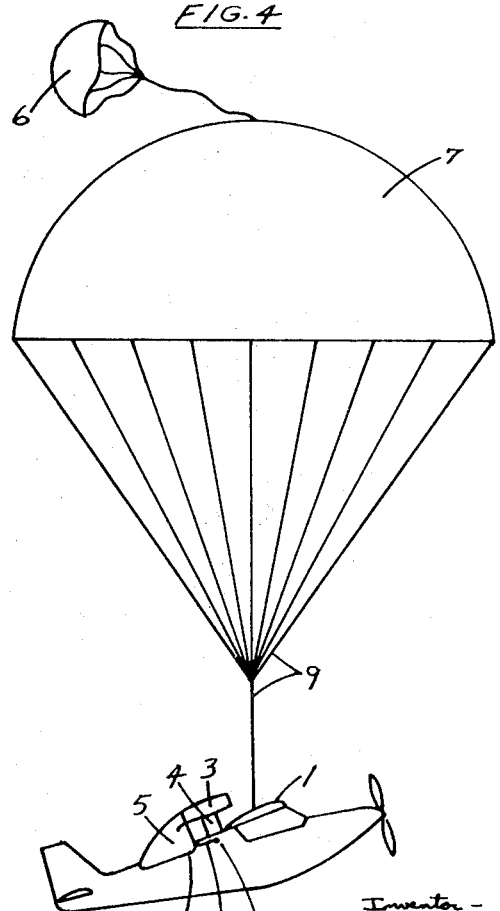

PATENTED NOV 23 1971 3,622,108

Inventor
George A. Mathewson
Drawn by Richard J. Varcoe

SAFETY DEVICE FOR DISABLED AIRPLANES

Basic Idea

This invention is designed to provide a workable safety device to temporarily sustain the flight of a disabled, light airplane. Although the idea of some sort of safety device is not new, this device contains several new ideas, which represent improvements on, and combinations of, existing patents. Basically, when a plane becomes disabled in flight, the pilot would release a safety device consisting of a balloon used in combination with a parachute. The parachute would open first to slow the speed of the plane, and thereafter the safety balloons would open to slow the speed to the point that the aircraft could land safely.

Main Components

This safety device consists of the following main components:

1. A pilot parachute, approximately 5 feet in diameter.
2. A main parachute, approximately 32 feet in diameter.
3. A nylon safety balloon with an estimated 40 foot diameter.
4. Small jet-type engine, which would produce a heated exhaust which would be pumped into the safety balloon to provide bouyancy.
5. Two turrets (plastic), containing the folded parachutes and balloon, which would be fastened at two points on the top of the fuselage. The rear turret is herein termed an "air anchor."

DESCRIPTION OF DIAGRAMS

FIG. I—is a view of the light aircraft in flight, with the 3 units of the safety device attached to the upper portion of the fuselage. (All drawings are chronological and in sequence.)

FIG. II—shows the front turret being carried away from the plane after the rocket has been exploded, and the pilot chute also being carried away from the plane.

FIG. III—shows the main parachute beginning to open as the plane begins to descend more sharply.

FIG. IV—shows the main chute fully opened, as the plane's forward movement has ceased, and the plane descends at a moderate speed.

FIG. V—is another lateral view showing the rear turret, or "air anchor," being driven away from the airplane by a rocket.

FIG. VI—shows the safety balloon unfolding from the turret, as the turret is carried away from the plane by passing air currents.

FIG. VII—shows the safety balloon completely unfolded, and in a position where it can be filled with air. The jet engine could be started at approximately this point, in order to provide heated gases or air to aid in the filling of the balloon.

FIG. VIII—shows the balloon filled, with the parachute still partially opened, as the plane descends to the ground at a safe speed.

DETAILED DESCRIPTION OF MECHANISM

Figure 5:
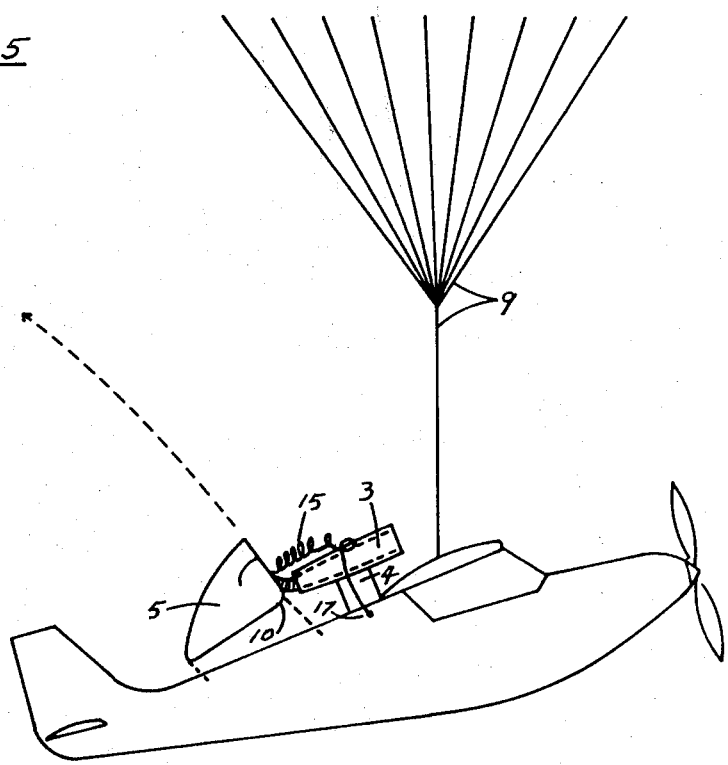

If a light airplane should encounter difficulty in flight, such that a crash landing seems to be inevitable, the pilot would explode a rocket 8 carried in the forward turret 2, which is fastened to the wing 1. This would cause the turret 2 to be discarded (FIG. 2) and would propel the pilot chute 6 and the main parachute 7 into a position from which they could open, somewhat above and behind the airplane, The main parachute would be attached by a nylon rope or wire cable 9 to the base of the turret, on the roof or wing 1 of the airplane.

The pilot chute would open first (FIG. 3), somewhat braking the speed of the falling airplane, and would also help to pull the main parachute to a position from which it could open. After the main parachute 7 opens (FIG. 4), the speed of the plane will be considerably slowed, but it is estimated it would still be descending at a rate in excess of 30 feet per second, depending on the initial glide path, head wind, initial speed of the plane, and other factors (weight of plane with occupant taken to be approximately 2,600 pounds.)

At this point a second rocket 10 would be fired (FIG. 5) which would cause the rear turret 5 to be ejected into the air above the plane, This turret 5 would contain the safety balloon 11 and appliances, and would initially be fastened to the fuselage directly behind the jet engine. This second turret 5, which is termed an "air anchor," would be caught in the wind currents passing the airplane, which would cause the "air anchor" and safety balloon to be carried to a position from which the balloon could be filled with air.

Figure 7:
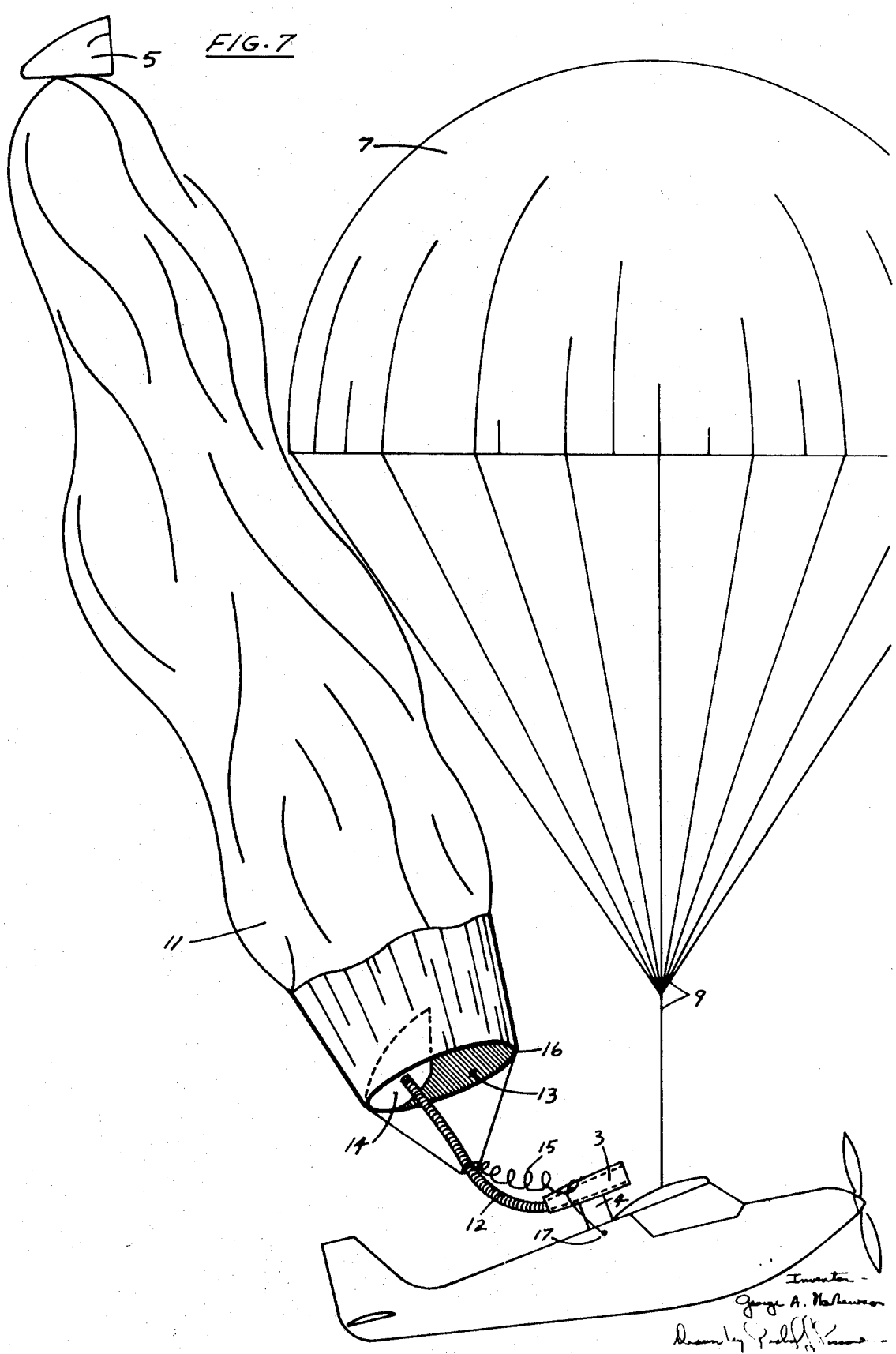

Since the balloon would have an estimate 6 foot circular opening 13 at its lower base or nadir, constructed of a hard, elastic rubber hoop 16, which would spring open automatically when unpacked, it would fill almost instantaneously as it unfolded in the wind currents created by the fall of the airplane (FIG. 7). The aperture at the base of the balloon would trap the passing air, and could be constructed somewhat larger or smaller, without departing from the basic idea. It would also be partially closed by a partition 14, which would be extended on an upward angle into the balloon for about 3 feet.

Figure 6:
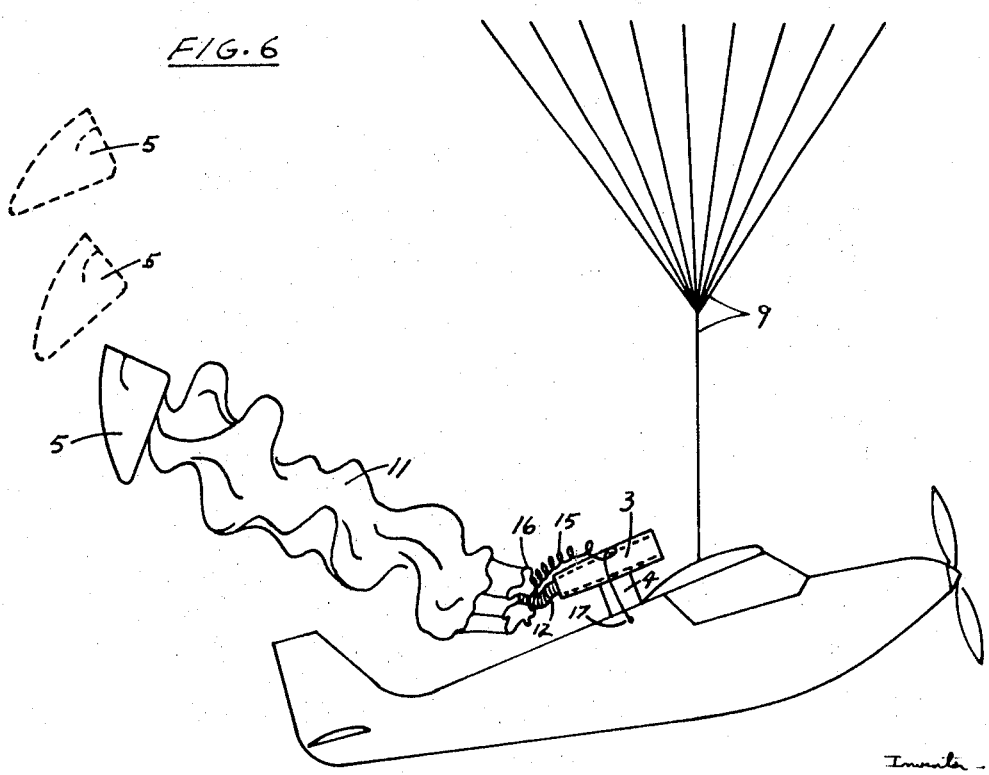
Figure 8:
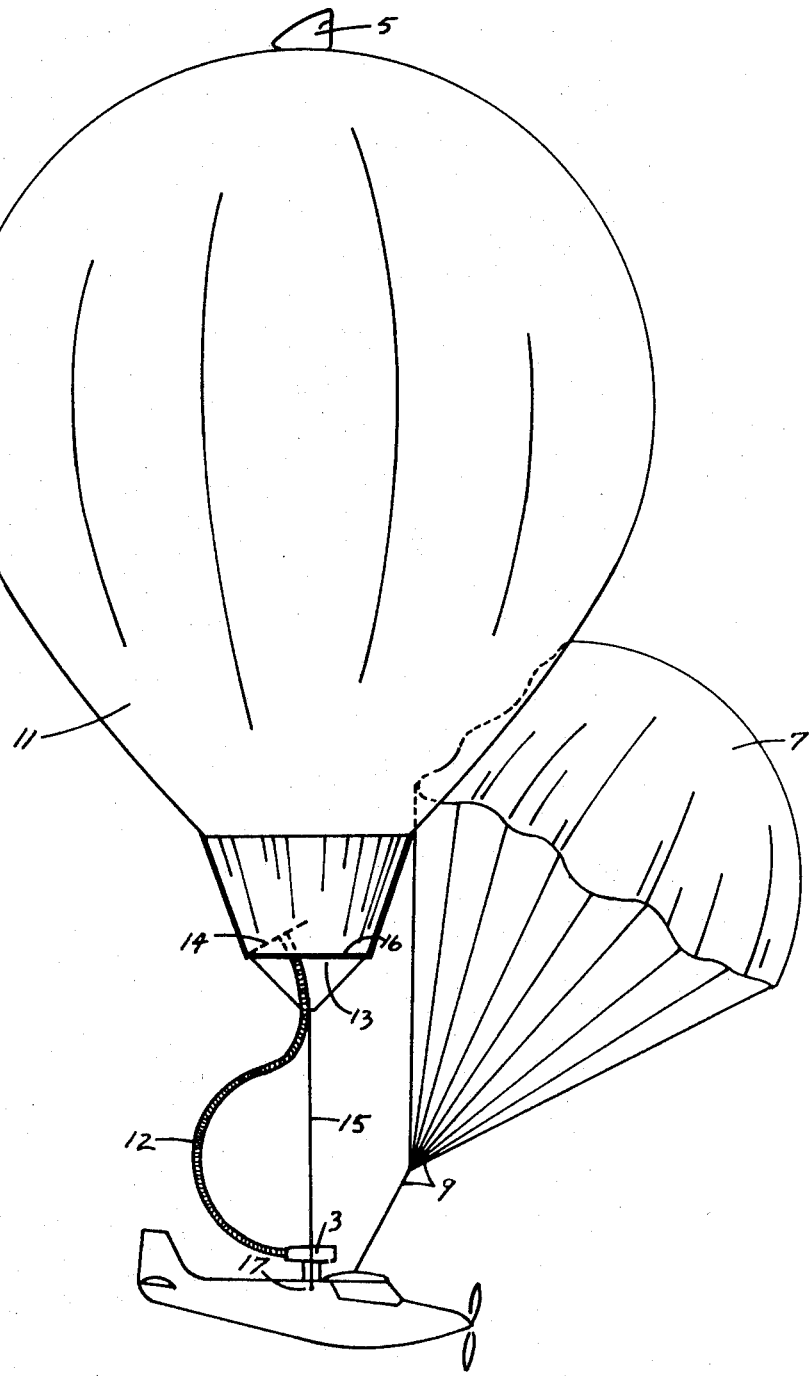

As soon as the rear turret 5 and balloon 11 are propelled away from the plane, (FIG. 6), the jet engine 3, located on a flange 4 just behind the wings, 1 would begin to function, and the exhaust from this jet engine would be carried via a hose 12, with an estimated diameter of 4 inches, to the partition at the base of the balloon and then to the inside of the safety balloon. The jet engine 3 would continue to pump heated exhaust gases into the balloon until it was filled with heated air (FIG. 8). It is estimated that a forty foot balloon, filled with heated air, will provide sufficient "lift" vector-forces to slow the speed of descent of a 2,400 pound plane to somewhat less than 20 feet per second. This speed of descent would allow the airplane to descend safely, without severe damage to the plane, pilot, or to buildings located on the ground.

The heated gases from the jet engine 3 would be mixed with cooler air upon reaching the balloon, and this would lower the temperature of the air within the balloon to a temperature which would not damage the balloon itself. The cooler air would be constantly entering the balloon from the aperture 13 at the base of the balloon and this would maintain a safe temperature.

The rate of the jet engine 3 would also be adjustable, so that it could be turned very low if sufficient lift and drag were already being provided by the safety device, or if the rate of descent became too rapid it could be accelerated in order to provide the balloon with higher temperature gas and greater lifting power.

The balloon would be attached to the airplane by a heavy woven nylon rope, or by a woven wire rope, 15 which would be fastened to the upper portion of the plane's fuselage 17. This would be stored in the rear turret, and would unwind as the turret moved away from the plane.

The use of a safety balloon, inflated by the heated exhaust gases from a jet engine, as a safety device would have a number of advantages over those safety devices for airplanes which have already been patented. These advantages consist of the following:

1. The use of a balloon filled with heated exhaust gases would provide greater lifting force, or deterrent to fall, than would the use of a single parachute, or even several parachutes. U.S. Pats. Nos. 1,702,422; 1,782,134; 1,786,169; Re. 22,859.
2. The previously described safety balloon would be preferable to a helium or hydrogen safety device (U.S. Pats. Nos. 1,461,216; 1,765,972; 2,665,093) because it eliminates the need for storing large amounts of a lighter-than-air gas on the plane itself, with the accompanying need for storage tanks and extensive amounts of expensive gas.
    a. The source of lifting energy would not be expendable, as would the lift derived from a given amount of helium, which would be limited by the size of the storage tank.

b. The jet engine would be operated at will during descent, with new heated gases being injected into the safety balloon whenever the temperature of the air within the balloon became too cool or the rate of descent became too fast. This would provide a method of increasing the degree of lift available at any given point during the descent of the plane.

3. The use of an open-ended balloon, rather than a closed balloon, would facilitate instantaneous opening or filling of the balloon, and would bring the time in which the device becomes operational within the range of usefulness to a rapidly falling airplane. (Distinguish U.S. Pat. No. 1,677,308, p. 3—balloon takes 10 to 20 minutes to fill.) (See also U.S. Pat. No. 3,229,932.)

4. Heated exhaust gases, it is estimated, will provide a greater lifting force, when heated to the maximum practical temperature of approximately 250 degrees, than would an equal amount of the natural gases such as helium or hydrogen.

5. The invention herein could be installed on existing designs of airplanes, rather than requiring a complete new plane, in contrast to the aircraft in U.S. Pat. No. 3,120,932. My invention provides a safety device which is put into operation only in emergency situations, while the Stahmer patent has a gas bag which is permanently inflated during flight and which really constitutes a new method of locomotion to be used for ordinary travel purposes. (See also U.S. Pat. No. 1,677,308.)

The previous description of this aeronautical safety device is in no way intended to limit the use of this device to a falling airplane which is still occupied by its pilot. It might operate automatically, even though the pilot has already parachuted to safety, or has been ejected by automatic device. Its function, in this situation, would be to prevent ground damage resulting from the uncontrolled falling and crashing of the airplane in a heavily populated area.

Neither is this intended to limit the use of this device to a particular type of engine. An internal combustion or propane engine might also be used to supply a large quantity of heated exhaust gases, but it is believed that a small jet engine would function more efficiently in the production of such heated gas. Furthermore, such jet engines as are presently in use on jet airplanes might be adapted to function alternately as a source of supply for filling safety balloons in emergency situations.

Neither is this safety device intended to be used only with a particular model or type of airplane.

In other words, various changes can be made in the embodiment of the invention herein specifically described without departing from or sacrificing any of the advantages thereof as defined in the appended claim.

I claim:

1. An emergency landing system for disabled aircraft, comprising means carried by the aircraft and deployable at will therefrom for initially reducing the forward motion and rate of descent of the aircraft, and additional means also carried by the aircraft and deployable at will therefrom subsequent to the preliminary effectiveness of the first-mentioned means, for further retarding the rate of descent of the aircraft to an appropriate rate of safe landing impact, said second-mentioned deployable means comprising an inflatable envelope flexibly connected to the aircraft, means for normally housing the envelope on the aircraft in a deflated inactive condition, and means for ejecting the envelope from the housing means, said housing means including a scooplike cover member attached to the top end of the envelope and having means for ejecting the same from the aircraft to act as an "air-anchor."

2. An emergency landing system for disabled aircraft as defined in claim 1, wherein said inflatable envelope has the form of a balloon, said balloon being provided at its lower end with an opening of substantial size and having a self-expanding flexible rim to quickly direct air into the balloon responsive to the descent of the aircraft when the balloon has been deployed.

3. An emergency landing system for disabled aircraft as defined in claim 1, wherein said inflatable envelope has the form of a balloon, said balloon being provided at its lower end with an opening of substantial size and having a self-expanding flexible rim to quickly direct air into the balloon responsive to the descent of the aircraft when the balloon has been deployed, and a source of gaseous medium carried by the aircraft and communicating with the opening in the lower end of the balloon.

4. An emergency landing system for disabled aircraft as defined in claim 1, wherein said inflatable envelope has the form of a balloon, said balloon being provided at its lower end with an opening of substantial size and having a self-expanding flexible rim to quickly direct air into the balloon responsive to the descent of the aircraft when the balloon has been deployed, and a source of gaseous medium carried by the aircraft and communicating with the opening in the lower end of the balloon, said gaseous medium source comprising a jet engine.

5. An emergency landing system for disabled aircraft as defined in claim 1, wherein, said inflatable envelope has the form of a balloon, said balloon being provided at its lower end with an opening of substantial size and having a self-expanding flexible rim to quickly direct air into the balloon responsive to the descent of the aircraft when the balloon has been deployed, and a source of gaseous medium carried by the aircraft and communicating with the opening in the lower end of the balloon, said gaseous medium source comprising a jet engine, and a flexible conduit connected to the exhaust of the jet engine and extending into the opening of the balloon to direct the heated exhaust gas from the engine into the balloon.

6. An emergency landing system for disabled aircraft as defined in claim 1, wherein said inflatable envelope has the form of a balloon, said balloon being provided at its lower end with an opening of substantial size and having a self-expanding flexible rim to quickly direct air into the balloon responsive to the descent of the aircraft when the balloon has been deployed, and a source of gaseous medium carried by the aircraft and communicating with the opening in the lower end of the balloon, said gaseous medium source comprising a jet engine, and a flexible conduit connected to the exhaust of the jet engine and extending into the opening of the balloon to direct the heated exhaust gas from the engine into the balloon, and the opening in the lower end of the balloon being provided with a flexible flap partially obstructing the opening in the zone of entrance of the exhaust gas from the jet engine.

* * * * *